US012367154B2

(12) United States Patent
Ingalls et al.

(10) Patent No.: US 12,367,154 B2
(45) Date of Patent: Jul. 22, 2025

(54) LOGGING GUEST PHYSICAL ADDRESS FOR MEMORY ACCESS FAULTS

(71) Applicant: SiFive, Inc., San Mateo, CA (US)

(72) Inventors: John Ingalls, Sunnyvale, CA (US); Andrew Waterman, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/086,635

(22) Filed: Dec. 21, 2022

(65) Prior Publication Data

US 2023/0195647 A1  Jun. 22, 2023

Related U.S. Application Data

(60) Provisional application No. 63/293,060, filed on Dec. 22, 2021.

(51) Int. Cl.
*G06F 12/1009*  (2016.01)
*G06F 12/1027*  (2016.01)

(52) U.S. Cl.
CPC ...... *G06F 12/1009* (2013.01); *G06F 12/1027* (2013.01); *G06F 2212/1032* (2013.01)

(58) Field of Classification Search
CPC ............ G06F 12/1009; G06F 12/1027; G06F 12/1036; G06F 12/1045; G06F 2212/1032; G06F 2212/1024; G06F 2212/1028; G06F 2212/151; G06F 2212/651; G06F 2212/684
See application file for complete search history.

(56) References Cited

U.S. PATENT DOCUMENTS

| | | | |
|---|---|---|---|
| 8,307,191 B1* | 11/2012 | Jain | G06F 12/1036 711/202 |
| 10,977,192 B1* | 4/2021 | Habusha | G06F 12/1027 |
| 2017/0344492 A1* | 11/2017 | Bolbenes | G06F 12/1009 |
| 2020/0065134 A1* | 2/2020 | Iyer | G06F 12/1009 |
| 2021/0406194 A1* | 12/2021 | Bryant | G06F 12/1027 |

OTHER PUBLICATIONS

Li, Qingyang. "User Level Page Faults." PhD diss., Carnegie Mellon University Pittsburgh, PA, 2020.*
A First Look at RISC-V Virtualization from an Embedded Systems Perspective by Bruno Sa, Jose Martins, Sandro Pinto; Aug. 16, 2021, 13 pages.

* cited by examiner

*Primary Examiner* — Tracy A Warren
(74) *Attorney, Agent, or Firm* — Kilpatrick Townsend & Stockton LLP

(57) ABSTRACT

Systems and methods are disclosed for logging guest physical address for memory access faults. For example, a method for logging guest physical address includes receiving a first address translation request from a processor pipeline at a translation lookaside buffer for a first guest virtual address; identifying a hit with a fault condition corresponding to the first guest virtual address; responsive to the fault condition, invoking a single-stage page table walk with the first guest virtual address to obtain a first guest physical address; and storing the first guest physical address with the first guest virtual address in a data store, wherein the data store is separate from an entry in the translation lookaside buffer that includes a tag that includes the first guest virtual address and data that includes a physical address.

19 Claims, 8 Drawing Sheets

LOGGING GUEST PHYSICAL ADDRESS FOR MEMORY ACCESS FAULTS

CROSS-REFERENCE TO RELATED APPLICATION(S)

This application claims priority to and the benefit of U.S. Provisional Patent Application Ser. No. 63/293,060, filed Dec. 22, 2021, the entire disclosure of which is hereby incorporated by reference.

TECHNICAL FIELD

This disclosure relates to logging guest physical address for memory access faults.

BACKGROUND

Processor pipelines fetch, decode, and execute instructions, including load instructions that read data from memory and store instructions that write data to memory. A processor pipeline may be configured to parallelize and, in some cases, reorder execution of instructions fetched from memory in a program order. There can also be long delays in executing memory operations, like stores and loads, which may access slow external memory through one or more layers of cache.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
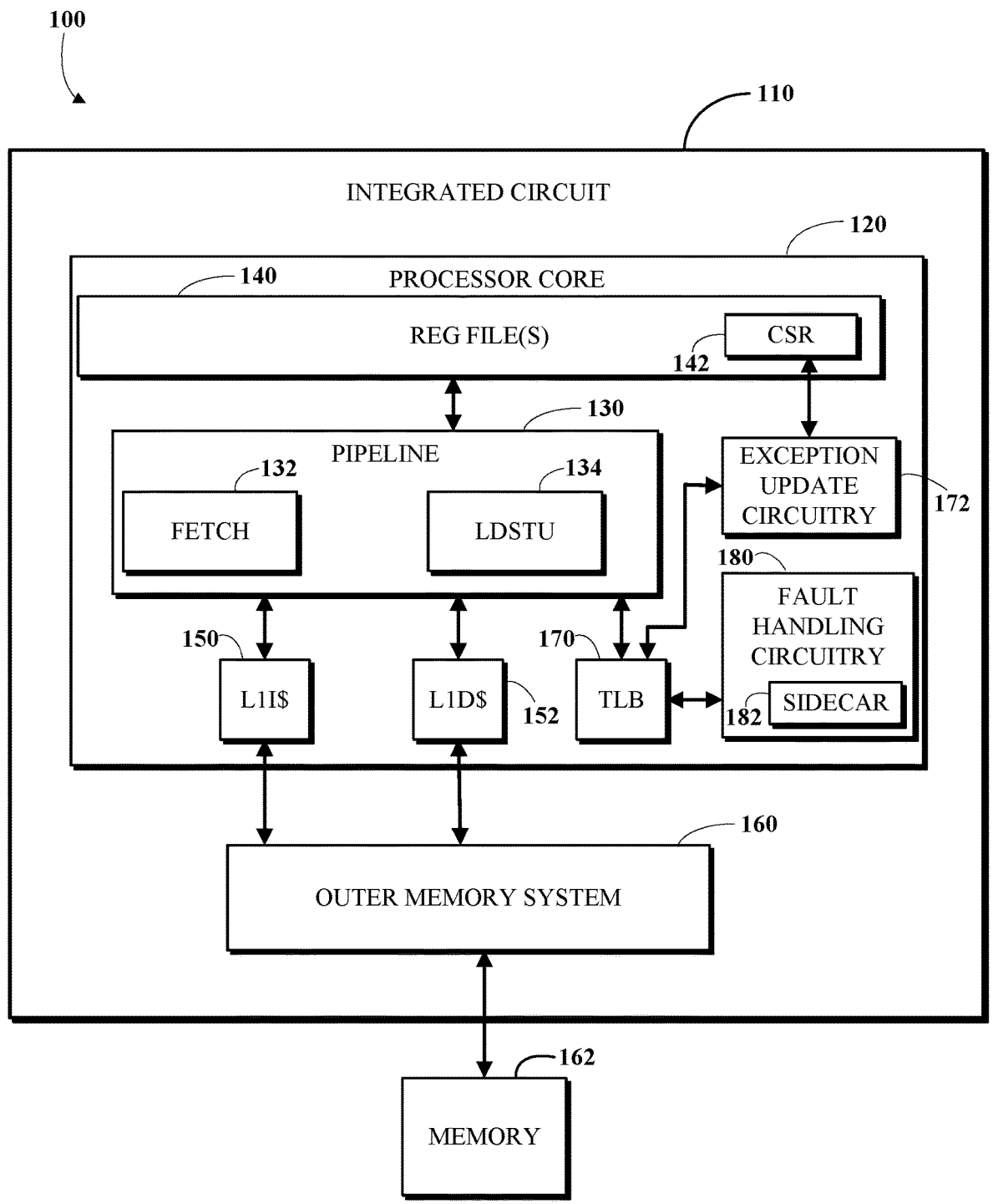
FIG. 1 is a block diagram of an example of a system for executing instructions, including fault handler circuitry for logging guest physical address for memory access faults.

Systems and methods are described herein that may be used to implement logging guest physical address for memory access faults. In a virtualized computing system, a hypervisor manages a physical computing device (e.g., a system on a chip (SOC)) to provide an environment in which one or more virtual machines run and are able to execute their own software. Virtualized computing systems may use a two-stage address translation model. For example, the hypervisor may have a page table for mapping its virtual addresses to physical addresses of memory in the physical computing device. A virtual machine running over the hypervisor may maintain its own page table for mapping its virtual addresses, which may be call guest virtual addresses, to its own simulated physical addresses, which may be called guest physical addresses. The guest physical addresses are thus a type of virtual address that is an intermediate point on the way to converting a guest virtual address to a physical address of the underlying computing device. A translation lookaside buffer may be configured to convert virtual addresses to physical addresses to facilitate access to memory in a computing device. When translating guest virtual addresses from a virtual machine running on the computing device, a translation lookaside buffer may be configured to perform a two-stage nested translation from a guest virtual address to a physical address via a corresponding guest physical address.

Fault conditions may be detected when an address is being translated for a memory access (e.g., when fetching a next instruction, when executing a load instruction, or when executing a store instruction). For example, a fault condition may occur where the permissions (e.g., read, write, execute) associated with a memory access do not satisfy the permission requirements of the memory location that it is attempting to access. For example, a store instruction that attempts to write to a memory location that is read-only may cause a fault condition. When a fault condition occurs while a virtual machine is executing instructions, it is useful for the hypervisor to be alerted so that the hypervisor can address the problem by reallocating memory as needed to a virtual machine. The hypervisor may be alerted by raising an exception and passing the hypervisor relevant data for the fault condition in one or more control status registers. It is useful for the hypervisor to receive the guest physical address associated with a fault condition. Otherwise, the hypervisor may have to perform single-stage page table walk in software, which can be slow and computationally expensive. A problem arises where the translation lookaside buffer that performs two-stage address translations may omit the intermediate guest physical addresses from entries in its address translation cache, because these intermediate addresses are typically not needed. One solution is to store the guest physical addresses in entries of the translation lookaside buffer so they can be accessed and forwarded to the hypervisor when a fault condition is detected. However, this solution can use a large amount of circuit area in the computing device where there are large number of entries in the translation lookaside buffer.

In some implementations, a small data store, which may be called a sidecar, is used to store a single guest physical address in response to a fault condition occurring. The sidecar may be selectively associated with an entry of the translation lookaside buffer by including a common tag (e.g., the guest virtual address that caused the fault condition). In some implementations, a single-stage translation may be performed in hardware (e.g., using page table walk circuitry) in response to a fault condition to populate the sidecar with the corresponding guest physical address. This guest physical address may then be transferred from the sidecar to a control status register when the fault condition is reported to an exception update circuitry in the processor core that detected the fault condition. In some implementations, a translation lookaside buffer is configured to invalidate the entry in the translation lookaside buffer associated with the fault condition and/or return a miss message to a processor pipeline in response the address translation request that triggered the fault condition. A processor core may be configured to retry the address translation request after putting it through a program order retry queue.

Some implementations may provide advantages over conventional systems for logging guest physical address for memory access faults, such as, for example, reducing area of the microarchitecture by avoiding storing a guest physical address for every entry of a translation lookaside buffer while supporting hardware determination of the guest physical address associated with a fault to improve performance of a virtualized system, and/or decreasing power consumption of a processor core in some conditions.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Details

FIG. 1 is a block diagram of an example of a system 100 for executing instructions, including fault handling circuitry for logging guest physical address for memory access faults. The system 100 includes an integrated circuit 110 (e.g., a system on a chip (SOC)) for executing instructions. The integrated circuit 110 includes a processor core 120. The processor core 120 includes a processor pipeline 130 that includes a fetch stage 132 for fetching instructions from memory and a load/store unit 134 for executing load instructions and store instructions. The processor core 120 includes one or more register files 140, which include a control status register 142. The processor core 120 includes an L1 instruction cache 150 and an L1 data cache 152. The integrated circuit 110 includes an outer memory system 160, which may include memory storing instructions and data and/or provide access to a memory 162 external to the integrated circuit that stores instructions and/or data. The processor core 120 includes a translation lookaside buffer 170, which may be configured to translate virtual addresses to physical addresses. The processor core 120 includes an exception update circuitry 172 configured to, upon an exception, gather and store data in one or more control status registers of the processor core 120. The integrated circuit 110 includes a fault handling circuitry 180, which includes a sidecar data store 182 for logging a guest physical address associated with a fault condition detected in the translation lookaside buffer 170. The fault handling circuitry 180 may be configured to, responsive to a fault condition on a hit in the translation lookaside buffer 170 for a first address translation request from the processor pipeline for a first guest virtual address, invoke a single-stage page table walk with the first guest virtual address to obtain a first guest physical address; and store the first guest physical address with the first guest virtual address in the sidecar data store 182. The fault handling circuitry 180 may also be configured to cause the translation lookaside buffer 170 to return a miss to the processor pipeline 130 in response the first address translation request rather than a hit with the fault condition. The integrated circuit 110 may provide advantages over conventional processor architectures, such as, for example, reducing area of the microarchitecture by avoiding storing a guest physical address for every entry of the translation lookaside buffer 170 while supporting hardware determination of the guest physical address associated with a fault to improve performance of a virtualized system, and/or conservation of power consumption. For example, the integrated circuit 110 may implement the process 400 of FIG. 4. For example, the integrated circuit 110 may implement the process 500 of FIG. 5. For example, the integrated circuit 110 may implement the process 600 of FIG. 6.

The integrated circuit 110 includes a processor core 120 including a processor pipeline 130 configured to fetch and execute instructions, including load instructions and store instructions. The processor pipeline 130 includes a fetch stage 132 that is configured to retrieve instructions from a memory system 160 of the integrated circuit 110. For example, the pipeline 130 may fetch instructions via the L1 instruction cache 150. The processor pipeline 130 includes a load/store unit 134 for executing load instructions and store instructions. The load/store unit 134 may access the outer memory system 160 via the L1 data cache 152 and utilize the translation lookaside buffer 170 to facilitate memory accesses. The processor pipeline 130 may include additional stages, such as decode, rename, dispatch, issue, execute, and write-back stages. For example, the processor core 120 may include a processor pipeline 130 configured to execute instructions of a RISC V instruction set. In some implementations, the load/store unit 134 may be separated into a load unit and a store unit.

The integrated circuit 110 includes one or more register files 140, which may include a program counter for the processor core 120. For example, the register files 140 may include registers of an instruction set architecture implemented by the processor core 120. The one or more register files 140 include a control status register 142 (e.g., a hypervisor trap control status register). The control status register 142 may be configured to store data to be used by a hypervisor running on the integrated circuit 110 when it responds to trap signal, such as an exception from the processor core 120.

The integrated circuit 110 includes an L1 instruction cache 150 for the processor core 120. The L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and may be used for verifying the way predictor.

The integrated circuit 110 includes an L1 data cache 152 for the processor core 120. For example, the L1 data cache 152 may be a set-associative virtually indexed, physically tagged (VIPT) cache, meaning that it is indexed purely with virtual address bits VA[set] and tagged fully with translated physical address bits PA[msb:12]. For low power consumption, the tag and data arrays may be looked up in serial so that at most a single data SRAM way is accessed. For example, the line size of the L1 data cache 152 may be 64 Bytes, and the beat size may be 16 Bytes. In some implementations, the L1 data cache 152 may be a physically indexed, physically tagged (PIPT) cache.

The integrated circuit 110 includes an outer memory system 160, which may include memory storing instructions and data and/or provide access to a memory 162 external to the integrated circuit 110 that stores instructions and/or data. For example, the integrated circuit 110 may include a memory storing hypervisor software that is configured to read the control status register 142 in response to receiving an exception from a processor core 120 including the processor pipeline 130. For example, the outer memory system 160 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the outer memory system 160 may include multiple layers.

The integrated circuit 110 includes a translation lookaside buffer 170 configured to translate virtual addresses to physical addresses. The translation lookaside buffer 170 may be configured to perform two-stage address translation to translate guest virtual addresses to physical addresses. An entry of the translation lookaside buffer 170 may include a tag that includes a guest virtual address and data that includes a physical address. The translation lookaside buffer 170 may be configured to omit guest physical addresses from its entries to save area in the integrated circuit 110. For example, the translation lookaside buffer 170 may be implemented using content-addressable memory (CAM), where the CAM search key is a virtual address, and the search result is a physical address. When a virtual address translation is not found in the translation lookaside buffer 170, a page table walk may be initiated to determine the physical address corresponding to a requested virtual address. For example, the translation lookaside buffer 170 may be fully associative. In some implementations, the translation lookaside buffer 170 may include multiple layers of address translation cache.

The integrated circuit 110 includes an exception update circuitry 172 configured to update one or more control status registers of the processor core 120 that includes the processor pipeline 130 in response to exceptions occurring in the processor core 120. The exception update circuitry 172 may be configured to gather information regarding fault conditions detected by the translation lookaside buffer 170.

The integrated circuit 110 includes a data store 182 configured to hold a guest physical address as data with a guest virtual address as a tag. For example, the data store 182 may include an array of flip flops. For example, the data store 182 may include a register. The data store 182 may be a sidecar in the sense that the data store 182 is separate from the entries in the translation lookaside buffer 170, but the data store 182 may be associated with an entry in the translation lookaside buffer 170 by storing a guest virtual address that matches a tag of the entry in the translation lookaside buffer 170. In this manner, the data store 182 may be used to selectively provide extra storage space associated with an entry of the translation lookaside buffer 170 that has encountered a fault condition. The data store 182 may provide a more circuit area efficient solution for storing the guest physical addresses associated with fault conditions detected in the translation lookaside buffer 170. In some implementations, the data store 182 is configured to store a guest fault flag indicating whether the fault condition corresponding to the first guest physical address occurred during a first stage or a second stage of a two-stage address translation. For example, the data store 182 may be implemented as the data store 300 of FIG. 3.

The integrated circuit 110 includes a fault handling circuitry 180. The fault handling circuitry 180 may be configured to log guest physical address associated with fault conditions detected in the translation lookaside buffer 170. The fault handling circuitry 180 may be configured to, responsive to a fault condition on a hit in the translation lookaside buffer 170 for a first address translation request from the processor pipeline 130 for a first guest virtual address, invoke a single-stage page table walk with the first guest virtual address to obtain a first guest physical address; and store the first guest physical address with the first guest virtual address in the data store 182. For example, the fault handling circuitry 180 may include page table walk circuitry that is configured to interface to the outer memory system 160 to perform the single-stage page table walk. The fault handling circuitry 180 may invoke the single-stage page table walk by using its own page table walk circuitry to perform the single-stage page table walk. In some implementations, the fault handling circuitry 180 is configured invoke the single-stage page table walk by sending a request with options specifying a single-stage page table walk to other page table walk circuitry in the processor core 120, which may also be used to perform two-stage address translations when presented with other optional parameters. For example, the fault handling circuitry 180 may be the fault handling circuitry 220 of FIG. 2.

In some implementations, the fault handling circuitry 180 is configured to transfer the first guest physical address from the data store 182 to the control status register 142 in response to a fault condition on a hit in the translation lookaside buffer 170 on an entry of the translation lookaside buffer 170 with a tag that includes a guest virtual address matching the first guest virtual address stored in the data store 182. The fault handling circuitry 180 may leverage the logic of the exception update circuitry 172 to transfer the first guest physical address to the control status register 142. For example, the first guest physical address may be transferred to the control status register 142 via a signal path through the translation lookaside buffer 170 and the exception update circuitry 172. In some implementations, the fault handling circuitry 180 transfers the guest physical address to the control status register 142 by responding to a request from the exception update circuitry 172 to the translation lookaside buffer 170 and/or by modifying a fault condition message sent from the translation lookaside buffer 170 to the exception update circuitry 172.

The fault handling circuitry 180 may be configured to, cause the translation lookaside buffer 170 to return a miss to the processor pipeline 130 in response the first address translation request rather than a hit with the fault condition. Sending a miss may cause the processor pipeline 130 to retry the first address translation request later and give the fault handling circuitry 180 some time to complete a single-stage page table walk to make the first guest physical address associated with the first address translation request available in the data store 182. The processor pipeline 130 may be configured to, in response to the miss, add the first address translation request to a queue of address translation requests to be retried in program order. For example, the processor pipeline 130 may implement the process 600 of FIG. 6.

In some implementations, the data store 182 is configured to store a valid flag and the fault handling circuitry 180 is configured to update the valid flag to prevent a guest physical address in the data store 182 from being overwritten before it is transferred to a control status register. For example, the fault handling circuitry 180 may implement the process 500 of FIG. 5 to update a valid flag in the sidecar data store 182.

Figure 2:
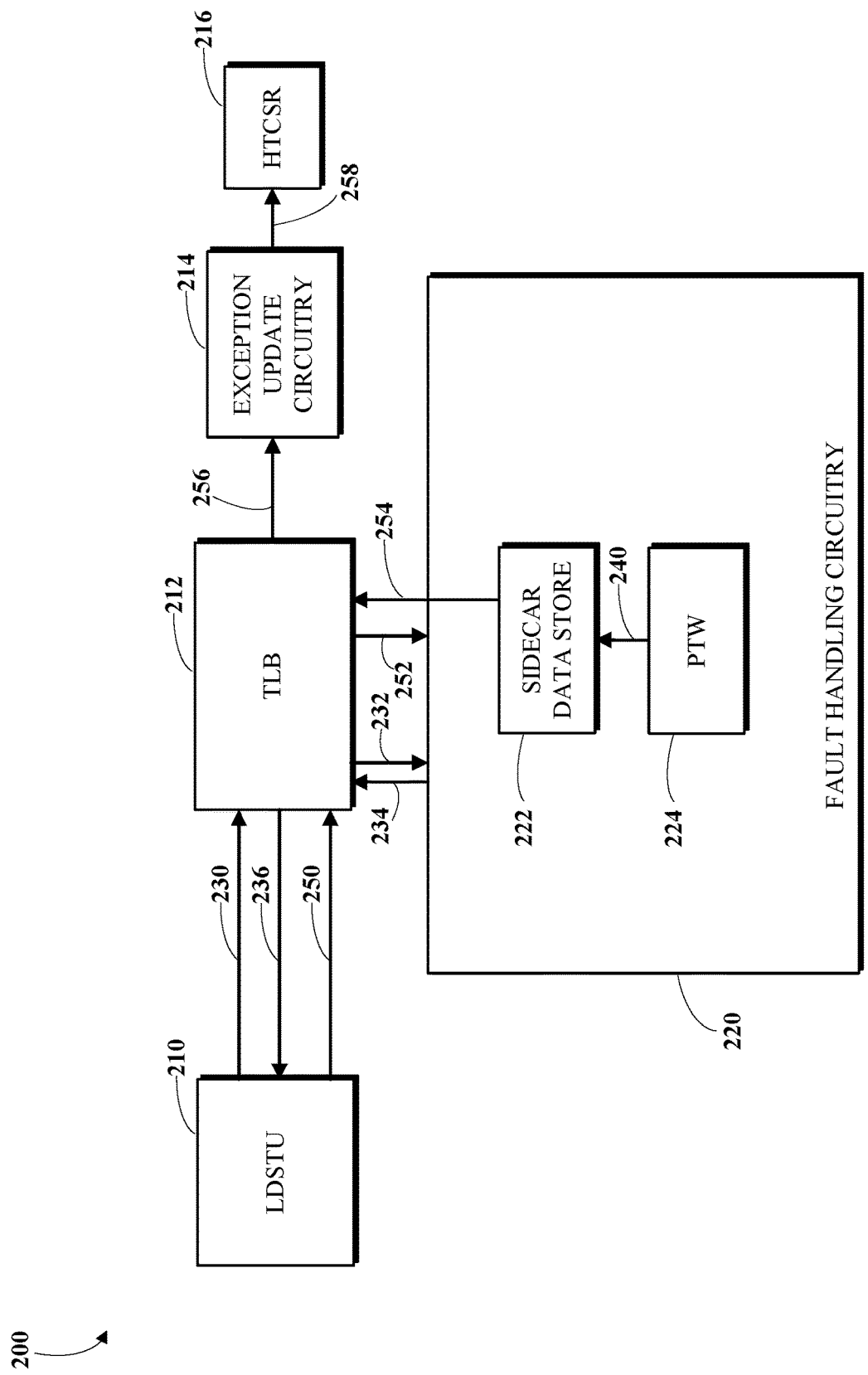
FIG. 2 is a block diagram of an example of a system for efficiently gathering exception data when a fault condition is detected during two-stage address translation in a translation lookaside buffer.

FIG. 2 is a block diagram of an example of a system 200 for efficiently gathering exception data when a fault condition is detected during two-stage address translation in a translation lookaside buffer. The system 200 includes a load/store unit 210, a translation lookaside buffer 212, an exception update circuitry 214, a hypervisor trap control status register 216, and a fault handling circuitry 220. The fault handling circuitry 220 includes a sidecar data store 222 and a page table walk circuitry 224. For example, the system 200 may be used to implement the process 400 of FIG. 4. For example, the system 200 may be used to implement the process 500 of FIG. 5. For example, the system 200 may be used to implement the process 600 of FIG. 6.

In an example usage scenario, the load/store unit 210 (e.g., a load/store pipe) sends a first address translation request 230 for a first guest virtual address to the translation lookaside buffer 212. In response to receiving the first address translation request 230, the translation lookaside buffer 212 identifies a hit with a fault condition corresponding to the first guest virtual address. For example, the fault condition may be caused by an attempt to write to a memory location with read-only permissions. Upon identification of the fault condition, the translation lookaside buffer 212 signals to fault handling circuitry 220 that a fault condition has been detected and provides the first guest virtual address 232 to the fault handling circuitry 220. The first guest virtual address 232 may be compared to a guest virtual address stored as a tag in the sidecar data store 222. The lack of a match may indicate that the guest physical address associate with this fault condition is not currently available in the sidecar data store 222. The fault handling circuitry 220 sends a signal 234 to the translation lookaside buffer 212 to cause the translation lookaside buffer 212 to return a miss 236 to the load/store unit 210 in response the first address translation request 230 rather than a hit with the fault condition. In some implementations, this may also cause invalidation of the entry in the translation lookaside buffer 212 that was hit. The fault handling circuitry 220 also invokes a single-stage page table walk, using the page table walk circuitry 224, with the first guest virtual address to obtain a first guest physical address 240. The fault handling circuitry 220 stores the first guest physical address 240 with the first guest virtual address 232 in the sidecar data store 222. The first guest virtual address 232 may be stored as a tag in the sidecar data store 222. The fault handling circuitry 220 may also update a valid flag in the sidecar data store 222 to indicate the first guest physical address is ready when storing the first guest physical address in the data store 222 The data store 222 is separate from an entry in the translation lookaside buffer 212 that includes a tag that includes the first guest virtual address 232 and data that includes a physical address. At a later time, the load/store unit 210 retries the first address translation request 250 by sending it to the translation lookaside buffer 212. When the translation lookaside buffer 212 identifies a hit with a fault condition for the first address translation request 250, it signals to the fault handling circuitry 220 and provides the first guest virtual address 252. The fault handling circuitry 220 compares to first guest virtual address 252 to the first guest virtual address stored in the sidecar data store 222 as a tag and finds a match. The fault handling circuitry 220 may check that the first guest physical address in the sidecar data store 222 is valid/ready by checking the valid bit in the sidecar data store 222. The fault handling circuitry 220 the sends a message 254 with the first guest physical address 240 to the translation lookaside buffer 212 to indicate that a guest physical address associated with the fault condition is available for logging. The translation lookaside buffer 212 then reports 256 the fault condition to the exception update circuitry 214. The exception update circuitry 214 writes data 258 associated with the fault condition, including the first guest physical address 240 to the hypervisor trap control status register 216. Hypervisor software may later read the data in the hypervisor trap control status register 216 and use it to modify the state of the memory to remove the fault condition so that a virtual machine that issued an instruction that caused the first address translation request 230 can proceed with execution of its software. The system 200 may enable the hypervisor to correct the fault condition without performing a costly page table walk in software to recover the first guest physical address 240, which may improve the performance of a virtualized computing system using the system 200.

Figure 3:
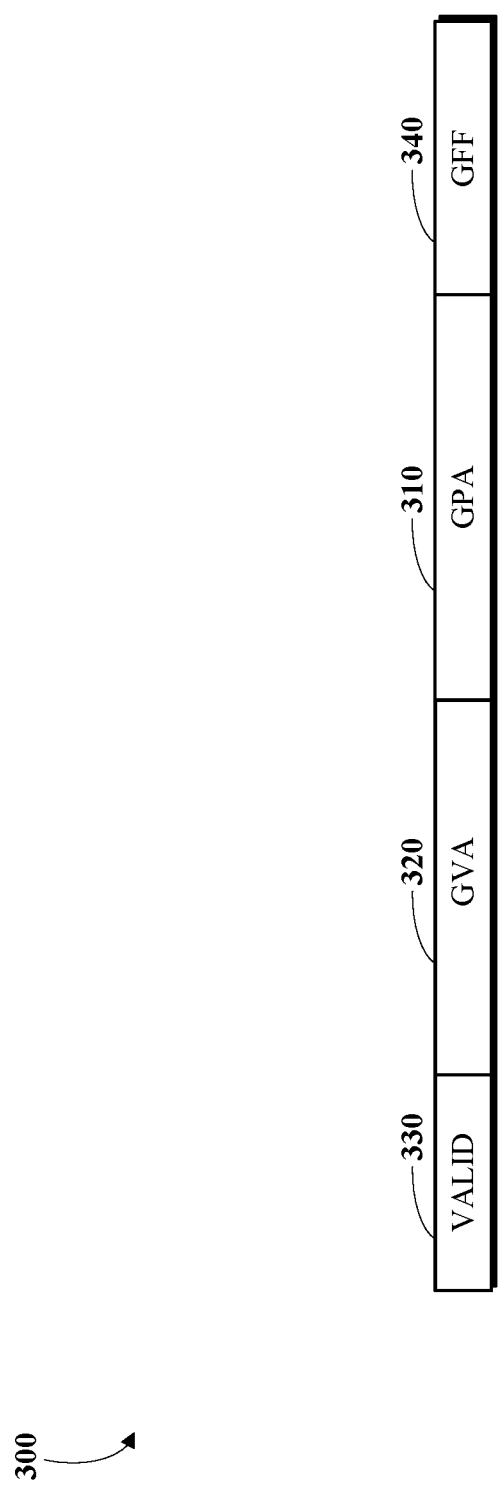
FIG. 3 is a block diagram of an example of a data store for storing a guest physical address associated with a fault condition detected in a translation lookaside buffer during a two-stage address translation.

FIG. 3 is a block diagram of an example of a data store 300 for storing a guest physical address associated with a fault condition detected in a translation lookaside buffer (e.g., the translation lookaside buffer 170) during a two-stage address translation. The data store 300 includes a guest physical address field 310 configured to store a guest physical address (e.g., a guest physical page number (GPA[msb: 12])). For example, the guest physical address field 310 may be an array of flip flops storing bits of a guest physical address. The data store 300 includes a guest virtual address field 320 configured to store a guest virtual address (e.g., a guest virtual page number (GVA[msb:12])). For example, the guest virtual address field 320 may be an array of flip flops storing bits of a guest virtual address that was translated in order to determine a guest physical address stored in the guest physical address field 310. The guest virtual address field 320 may serve as a tag for the data store 300 that enables the data store 300 to be associated with an entry in the translation lookaside buffer.

The data store 300 includes a valid flag 330, which may be flip flop storing a bit indicating whether a guest physical address in the is valid and ready to be transferred to a control status register (e.g., the hypervisor trap control status register). For example, the process 500 of FIG. 5 may be implemented to update the valid flag 330.

The data store 300 includes a guest fault flag 340, which may be flip flop storing a bit indicating whether the fault condition corresponding to a guest physical address stored in the guest physical address field 310 occurred during a first stage or a second stage of a two-stage address translation.

Figure 4:
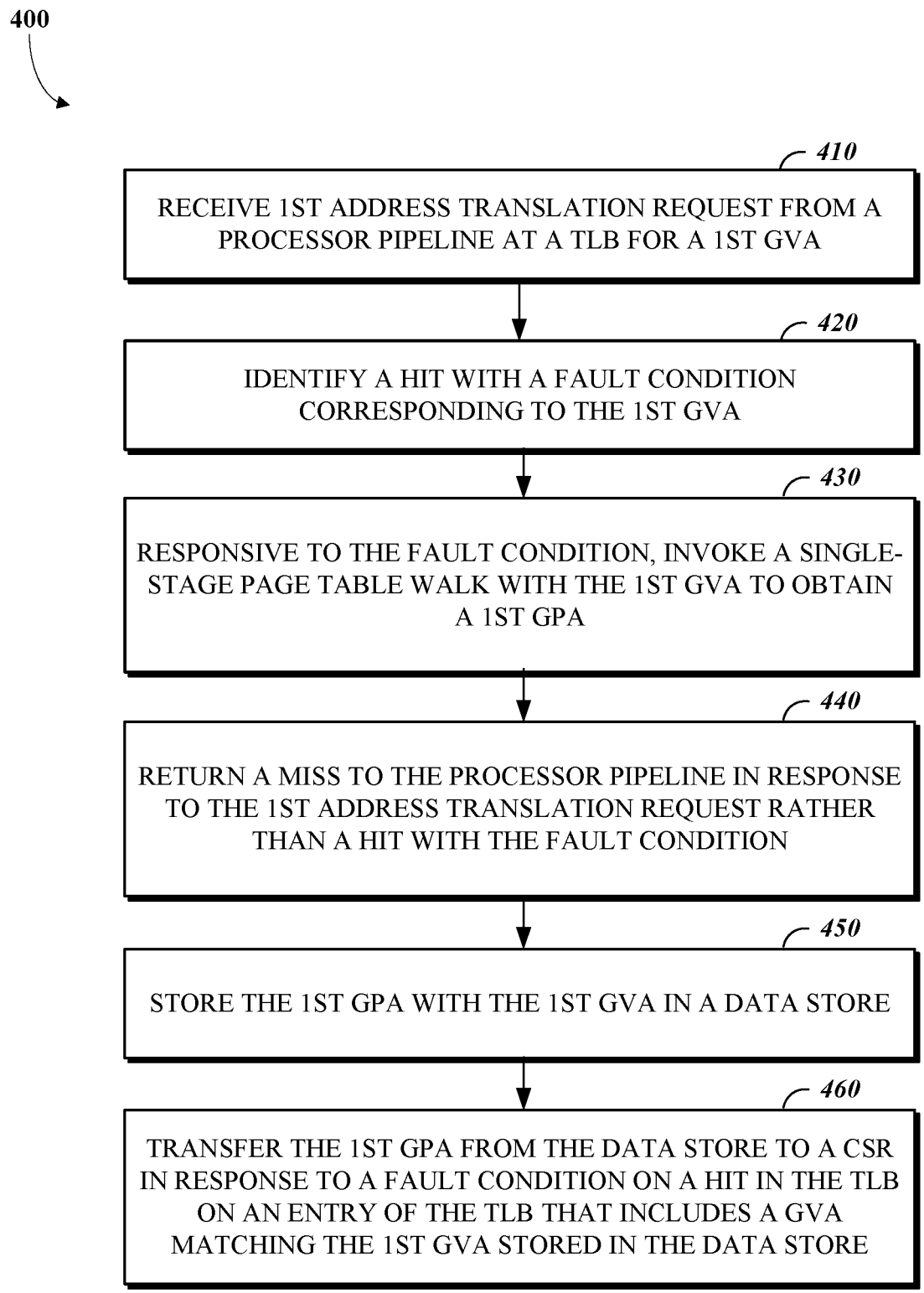
FIG. 4 is a flow chart of an example of a process for logging guest physical address for memory access faults.

FIG. 4 is a flow chart of an example of a process 400 for logging guest physical address for memory access faults. The process 400 includes receiving 410 a first address translation request from a processor pipeline at a translation lookaside buffer for a first guest virtual address; identifying 420 a hit with a fault condition corresponding to the first guest virtual address; responsive to the fault condition, invoking 430 a single-stage page table walk with the first guest virtual address to obtain a first guest physical address; returning 440 a miss to the processor pipeline in response the first address translation request rather than a hit with the fault condition; storing 450 the first guest physical address with the first guest virtual address in a data store; and transferring 460 the first guest physical address from the data store to a control status register in response to a fault condition on a hit in the translation lookaside buffer on an entry of the translation lookaside buffer with a tag that includes a guest virtual address matching the first guest virtual address stored in the data store. Some implementations may provide advantages, such as, for example, improving performance a virtualized computing system, reducing the circuit area, and/or decreasing power consumption of a processor pipeline in some conditions. For example, the process 400 may be implemented using the system 100 of FIG. 1. For example, the process 400 may be implemented using the system 200 of FIG. 2.

The process 400 includes receiving 410 a first address translation request from a processor pipeline at a translation lookaside buffer (e.g., the translation lookaside buffer 170) for a first guest virtual address. For example, the first address translation request may be received via a bus.

The process 400 includes identifying 420 a hit with a fault condition corresponding to the first guest virtual address. For example, the fault condition may be caused by an attempt to read a memory location for which no permissions are available to the virtual machine responsible for the request. For example, the fault condition may be caused by an attempt to write to a memory location with read-only permissions. For example, the fault condition may be caused by an attempt to fetch an instruction from a memory location for which execution permissions are lacking.

The process 400 includes, responsive to the fault condition, invoking 430 a single-stage page table walk with the first guest virtual address to obtain a first guest physical address. For example, invoking 430 a single-stage page table walk with the first guest virtual address may include performing the single-stage page table walk using a dedicate single-stage page table walk circuitry. In some implementations, invoking 430 a single-stage page table walk with the first guest virtual address includes sending a request with options specifying a single-stage page table walk to other page table walk circuitry in the processor core, which may also be used to perform two-stage address translations when presented with other optional parameters.

The process 400 includes returning 440 a miss to the processor pipeline in response the first address translation request rather than a hit with the fault condition. The processor pipeline may be configured to, in response to the miss, add the first address translation request to a queue of address translation requests to be retried in program order. For example, the process 600 of FIG. 6 may implemented to respond to the miss. In some implementations, an entry of the translation lookaside buffer that was hit with a fault condition is invalidated to await the determination and storage of the first guest physical address in the data store.

The process 400 includes storing 450 the first guest physical address with the first guest virtual address in a data store (e.g., the data store 300). The data store may be separate from an entry in the translation lookaside buffer that includes a tag that includes the first guest virtual address and data that includes a physical address. In some implementations, the data store is configured to store a guest fault flag indicating whether the fault condition corresponding to the first guest physical address occurred during a first stage or a second stage of a two-stage address translation. In some implementations, the data store is configured to store a valid flag, which may be update and checked to prevent transfer of invalid data from the data store as a guest physical address to a control status register and to prevent a valid guest physical address from being overwritten before it can be transferred to a control status register. For example, the process 500 of FIG. 5 may be implemented to update the valid flag of the data store.

The process 400 includes transferring 460 the first guest physical address from the data store to a control status register (e.g., the hypervisor trap control status register 216) in response to a fault condition on a hit in the translation lookaside buffer on an entry of the translation lookaside buffer with a tag that includes a guest virtual address matching the first guest virtual address stored in the data store. For example, the control status register may be read by hypervisor software in response to receiving an exception from a processor core including the processor pipeline. In some implementations, logic of an exception handling circuitry (e.g., the exception update circuitry 172) may be leveraged to transfer the first guest physical address to the control status register. For example, the first guest physical address may be transferred to the control status register via a signal path through the translation lookaside buffer and the exception handling circuitry. In some implementations, the guest physical address is transferred 460 by responding to a request from the exception handling circuitry to the translation lookaside buffer and/or by modifying a fault condition message sent from the translation lookaside buffer to the exception handling circuitry.

Figure 5:
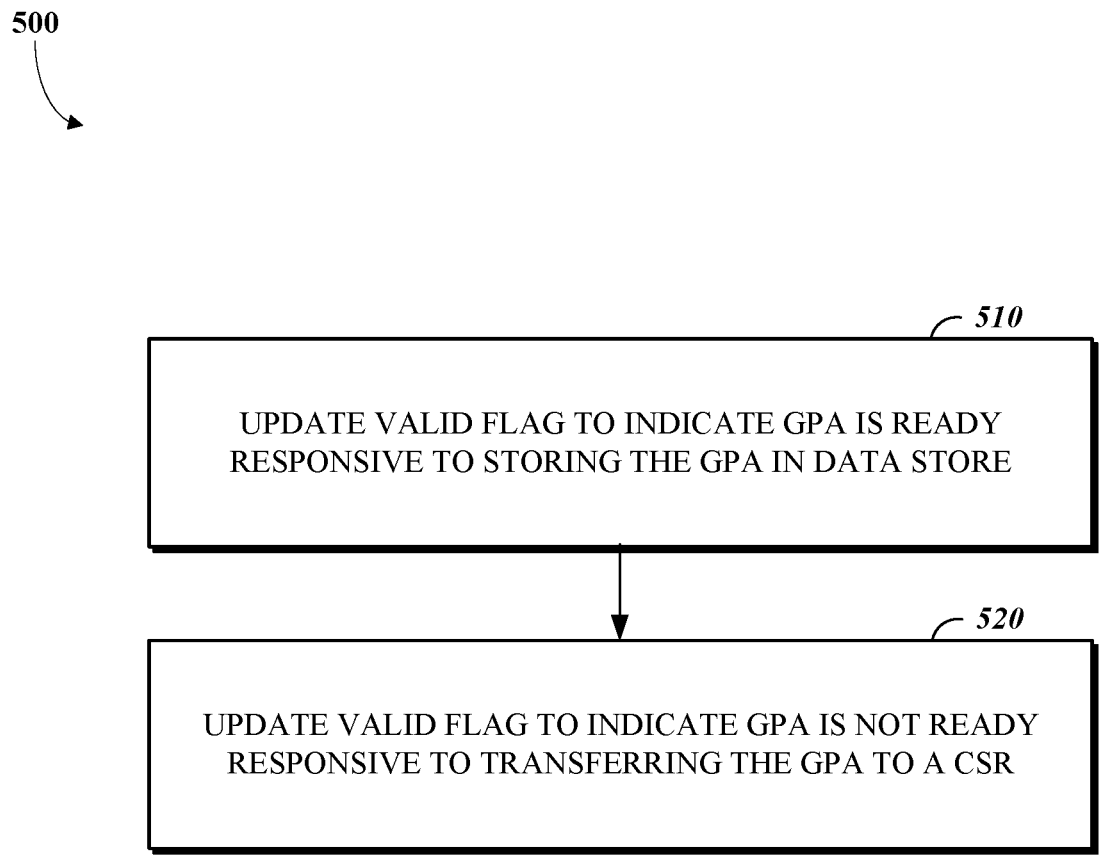
FIG. 5 is a flow chart of an example of a process for updating a valid bit for a data store used to store a guest physical address associated with a fault condition detected in a translation lookaside buffer during a two-stage address translation.

FIG. 5 is a flow chart of an example of a process 500 for updating a valid bit for a data store (e.g., the data store 300) used to store a guest physical address associated with a fault condition detected in a translation lookaside buffer (e.g., the translation lookaside buffer 170) during a two-stage address translation. The process 500 includes updating 510 the valid flag to indicate the first guest physical address is ready when storing the first guest physical address in the data store; and updating 520 the valid flag to indicate the first guest physical address is not ready responsive to transferring the first guest physical address to a control status register. The valid flag in the data store may be check before writing a guest physical address to or reading a guest physical address from the data store. The process 500 may serve to prevent transfer of invalid data as a guest physical address to a control status register and prevent a valid guest physical address from being overwritten before it can be transferred to a control status register. For example, the process 500 may be implemented using the system 100 of FIG. 1. For example, the process 500 may be implemented using the system 200 of FIG. 2.

Figure 6:
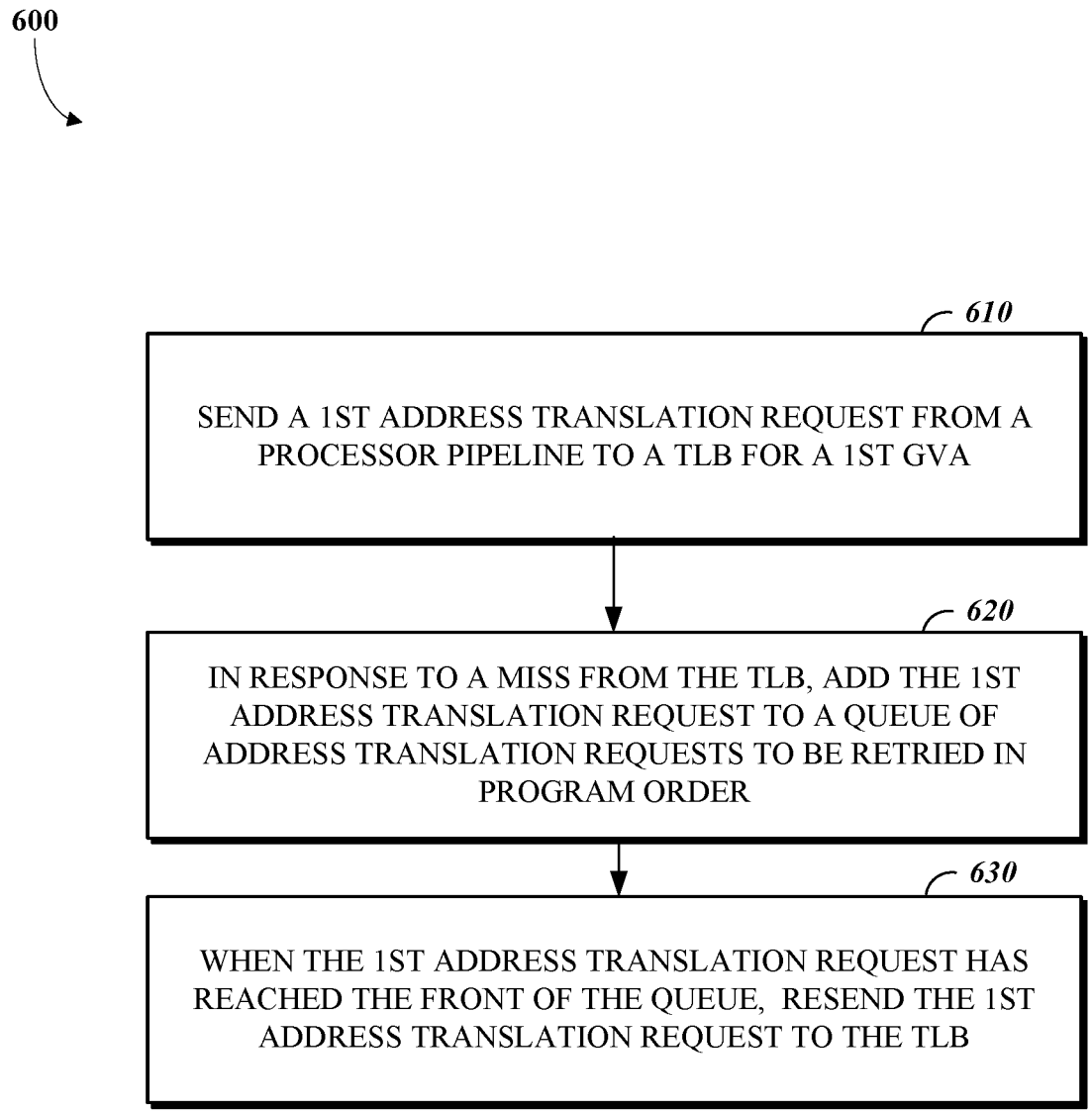
FIG. 6 is a flow chart of an example of a process for a processor pipeline to resend an address translation request in response to a miss message from a translation lookaside buffer.

FIG. 6 is a flow chart of an example of a process 600 for a processor pipeline to resend an address translation request in response to a miss message from a translation lookaside buffer. The process 600 includes sending 610 a first address translation request from a processor pipeline to a translation lookaside buffer for a first guest virtual address; in response to a miss from the translation lookaside buffer, adding 620 the first address translation request to a queue of address translation requests to be retried in program order; and, when the first address translation has reached the front of the queue, resending 630 the first address translation request to the translation lookaside buffer. For example, the process 600 may be implemented using the processor pipeline 130 of FIG. 1. For example, the process 600 may be implemented using the load/store unit 210 of FIG. 2.

Figure 7:
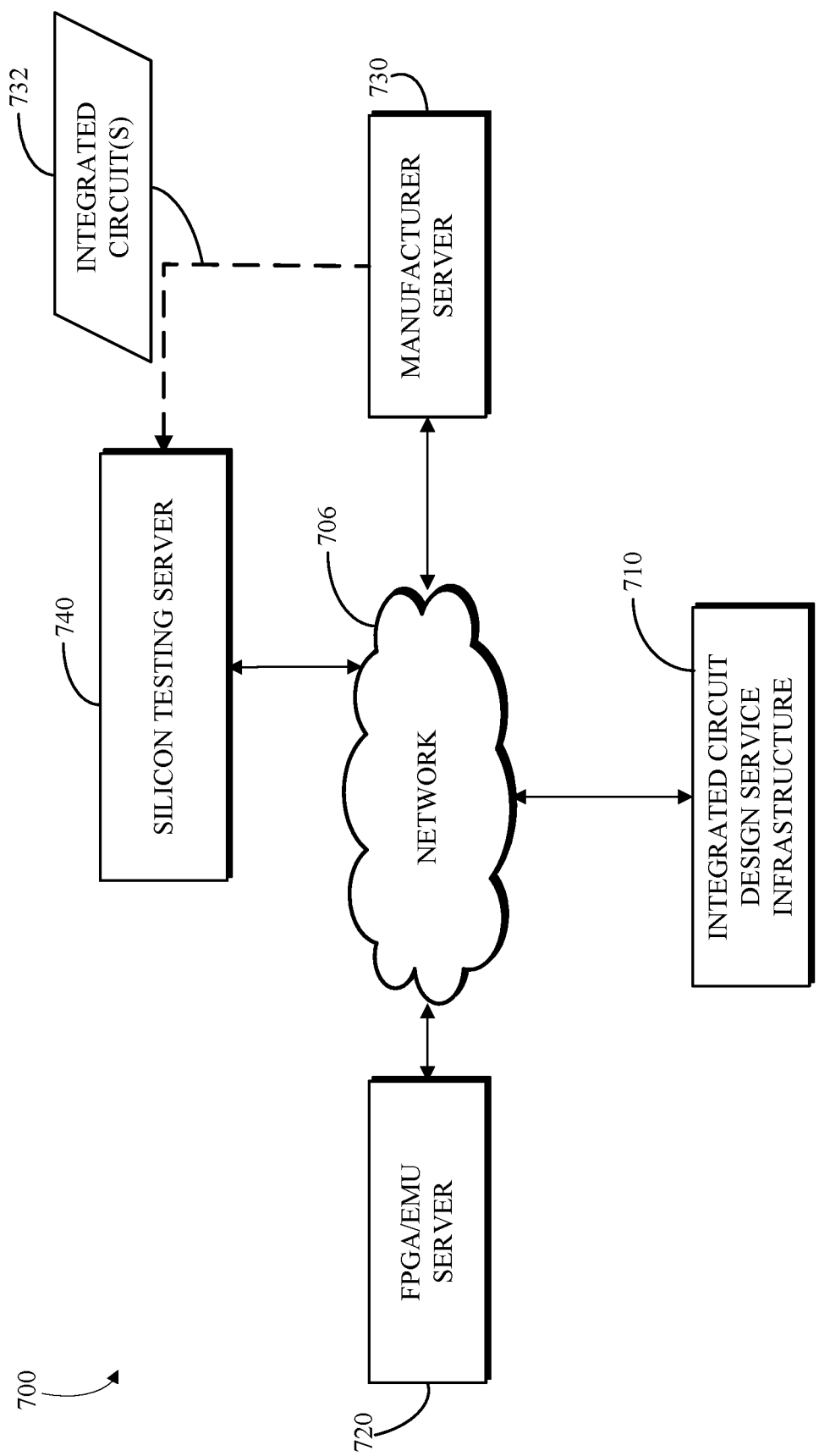
FIG. 7 is a block diagram of an example of a system for facilitating generation and manufacture of integrated circuits.

FIG. 7 is a block diagram of an example of a system 700 for generation and manufacture of integrated circuits. The system 700 includes a network 706, an integrated circuit design service infrastructure 710, a field programmable gate array (FPGA)/emulator server 720, and a manufacturer server 730. For example, a user may utilize a web client or a scripting API client to command the integrated circuit design service infrastructure 710 to automatically generate an integrated circuit design based on a set of design parameter values selected by the user for one or more template integrated circuit designs. In some implementations, the integrated circuit design service infrastructure 710 may be configured to generate an integrated circuit design that includes the circuitry shown and described in FIG. 1.

The integrated circuit design service infrastructure 710 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 710 may invoke (e.g., via network communications over the network 706) testing of the resulting design that is performed by the FPGA/emulation server 720 that is running one or more FPGAs or other types of hardware or software emulators. For example, the integrated circuit design service infrastructure 710 may invoke a test using a field programmable gate array, programmed based on a field programmable gate array emulation data structure, to obtain an emulation result. The field programmable gate array may be operating on the FPGA/emulation server 720, which may be a cloud server. Test results may be returned by the FPGA/emulation server 720 to the integrated circuit design service infrastructure 710 and relayed in a useful format to the user (e.g., via a web client or a scripting API client).

The integrated circuit design service infrastructure 710 may also facilitate the manufacture of integrated circuits using the integrated circuit design in a manufacturing facility associated with the manufacturer server 730. In some implementations, a physical design specification (e.g., a graphic data system (GDS) file, such as a GDS II file) based on a physical design data structure for the integrated circuit is transmitted to the manufacturer server 730 to invoke manufacturing of the integrated circuit (e.g., using manufacturing equipment of the associated manufacturer). For example, the manufacturer server 730 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 710 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 710 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 730 may fabricate and/or test integrated circuits based on the integrated circuit design. For example, the associated manufacturer (e.g., a foundry) may perform optical proximity correction (OPC) and similar post-tapeout/ pre-production processing, fabricate the integrated circuit(s) 732, update the integrated circuit design service infrastructure 710 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 710 on the status of the packaging and delivery process periodically or asynchronously. In some implementations, status updates may be relayed to the user when the user checks in using the web interface and/or the controller might email the user that updates are available.

In some implementations, the resulting integrated circuits 732 (e.g., physical chips) are delivered (e.g., via mail) to a silicon testing service provider associated with a silicon testing server 740. In some implementations, the resulting integrated circuits 732 (e.g., physical chips) are installed in a system controlled by silicon testing server 740 (e.g., a cloud server) making them quickly accessible to be run and tested remotely using network communications to control the operation of the integrated circuits 732. For example, a login to the silicon testing server 740 controlling a manufactured integrated circuits 732 may be sent to the integrated circuit design service infrastructure 710 and relayed to a user (e.g., via a web client). For example, the integrated circuit design service infrastructure 710 may control testing of one or more integrated circuits 732, which may be structured based on an RTL data structure.

Figure 8:
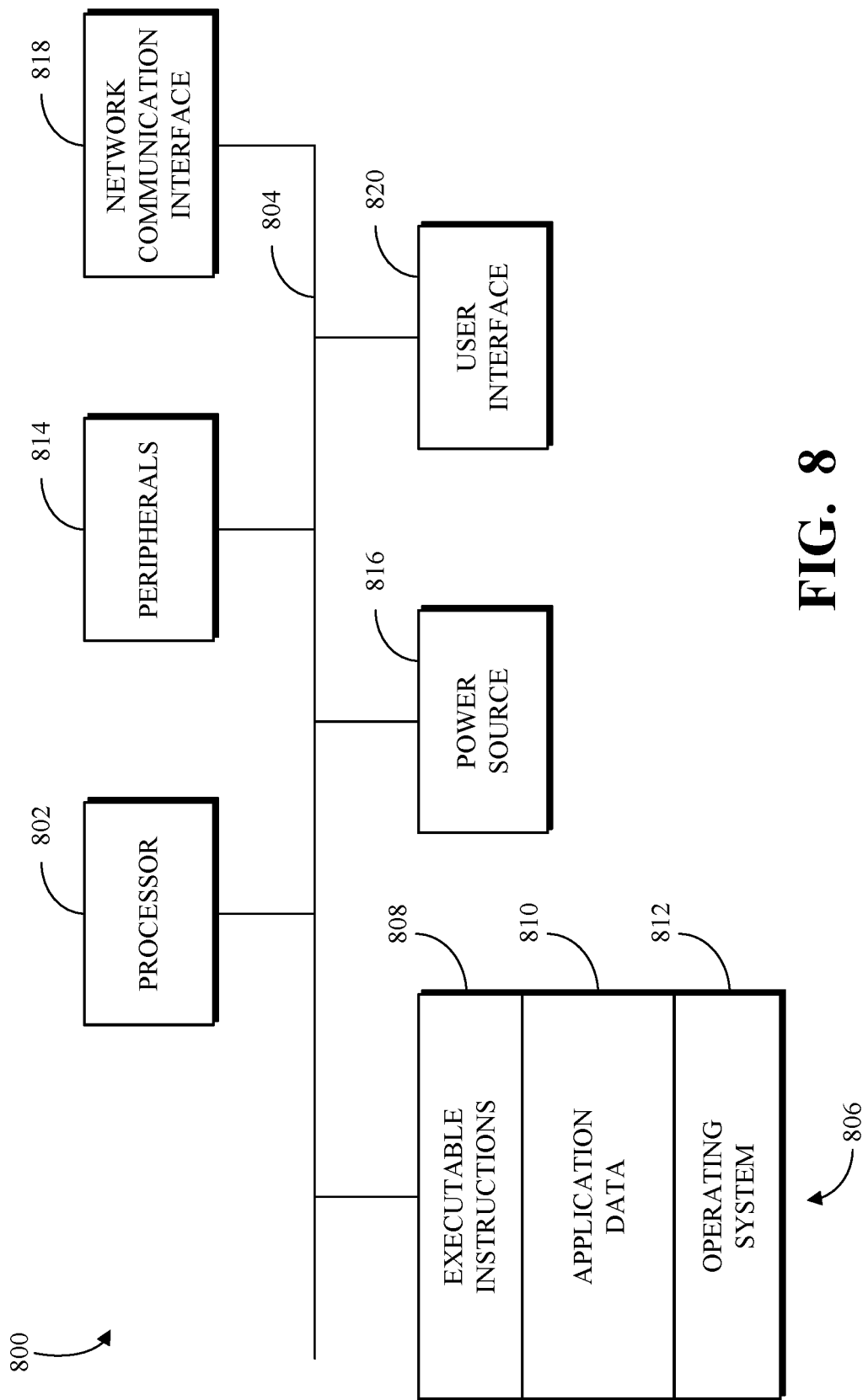
FIG. 8 is a block diagram of an example of a system for facilitating generation of integrated circuits.

FIG. 8 is a block diagram of an example of a system 800 for facilitating generation of integrated circuits, for facilitating generation of a circuit representation for an integrated circuit, and/or for programming or manufacturing an integrated circuit. The system 800 is an example of an internal configuration of a computing device. The system 800 may be used to implement the integrated circuit design service infrastructure 710, and/or to generate a file that generates a circuit representation of an integrated circuit design including the circuitry shown and described in FIG. 1. The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as RAM, and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, such as the network 706 shown in FIG. 7, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an integrated circuit for executing instructions that includes a processor pipeline configured to fetch and execute instructions, including load instructions and store instructions; a translation lookaside buffer configured to perform two-stage address translation to translate guest virtual addresses to physical addresses, wherein an entry of the translation lookaside buffer includes a tag that includes a guest virtual address and data that includes a physical address; a data store configured to hold a guest physical address as data with a guest virtual address as a tag; and a fault handling circuitry that is configured to: responsive to a fault condition on a hit in the translation lookaside buffer for a first address translation request from the processor pipeline for a first guest virtual address, invoke a single-stage page table walk with the first guest virtual address to obtain a first guest physical address; and store the first guest physical address with the first guest virtual address in the data store.

In a second aspect, the subject matter described in this specification can be embodied in methods that include receiving a first address translation request from a processor pipeline at a translation lookaside buffer for a first guest virtual address; identifying a hit with a fault condition corresponding to the first guest virtual address; responsive to the fault condition, invoking a single-stage page table walk with the first guest virtual address to obtain a first guest physical address; and storing the first guest physical address with the first guest virtual address in a data store, wherein the data store is separate from an entry in the translation lookaside buffer that includes a tag that includes the first guest virtual address and data that includes a physical address.

In a third aspect, the subject matter described in this specification can be embodied in an integrated circuit for executing instructions that includes a processor pipeline configured to fetch and execute instructions, including load instructions and store instructions; a translation lookaside buffer configured to perform two-stage address translation to translate guest virtual addresses to physical addresses, wherein an entry of the translation lookaside buffer includes a tag that includes a guest virtual address and data that includes a physical address; a data store configured to hold a guest physical address as data with a guest virtual address as a tag; and a fault handling circuitry that is configured to: responsive to a fault condition on a hit in the translation lookaside buffer for a first address translation request from the processor pipeline for a first guest virtual address, invoke a single-stage page table walk with the first guest virtual address to obtain a first guest physical address; cause the translation lookaside buffer to return a miss to the processor pipeline in response the first address translation request rather than a hit with the fault condition; and store the first guest physical address with the first guest virtual address in the data store.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
   a processor pipeline configured to fetch and execute instructions, including load instructions and store instructions;
   a translation lookaside buffer configured to perform two-stage address translation to translate guest virtual addresses to physical addresses, wherein an entry of the translation lookaside buffer includes a tag that includes a guest virtual address and data that includes a physical address;
   a data store configured to:
      hold a guest physical address and the guest virtual address; and
      store a guest fault flag indicating whether a fault condition corresponding to a first guest physical address occurred during a first stage or a second stage of the two-stage address translation; and
   a fault handling circuitry that is configured to:
      responsive to the fault condition on a hit in the translation lookaside buffer for a first address translation request from the processor pipeline for a first guest virtual address, invoke a single-stage page table walk with the first guest virtual address to obtain the first guest physical address; and
      store the first guest physical address with the first guest virtual address in the data store.

2. The integrated circuit of claim 1, in which the fault handling circuitry is configured to:
   transfer the first guest physical address from the data store to a control status register in response to the fault condition being on an entry of the translation lookaside buffer with the tag that includes the guest virtual address matching the first guest virtual address stored in the data store.

3. The integrated circuit of claim 2, comprising:
   an exception handling circuitry configured to update a processor core that includes the processor pipeline in response to exceptions occurring in the processor core, in which the first guest physical address is transferred to the control status register via a signal path through the translation lookaside buffer and the exception handling circuitry.

4. The integrated circuit of claim 2, comprising:
   a memory storing hypervisor software that is configured to read the control status register in response to receiving an exception from a processor core including the processor pipeline.

5. The integrated circuit of claim 1, in which the fault handling circuitry is configured to:
cause the translation lookaside buffer to return a miss to the processor pipeline in response the first address translation request.

6. The integrated circuit of claim 5, in which the processor pipeline is configured to:
in response to the miss, add the first address translation request to a queue of address translation requests to be retried in program order.

7. The integrated circuit of claim 1, in which the data store is configured to store a valid flag, and in which the fault handling circuitry is configured to:
update the valid flag to indicate the first guest physical address is ready when storing the first guest physical address in the data store; and
update the valid flag to indicate the first guest physical address is not ready responsive to transferring the first guest physical address to a control status register.

8. A method comprising:
receiving, by a translation lookaside buffer, a first address translation request from a processor pipeline at the translation lookaside buffer for a first guest virtual address;
identifying, by the translation lookaside buffer, a hit and a fault condition corresponding to the first guest virtual address;
responsive to the fault condition, invoking a single-stage page table walk with the first guest virtual address to obtain a first guest physical address;
storing the first guest physical address with the first guest virtual address in a data store, wherein the data store is separate from an entry in the translation lookaside buffer that includes a tag that includes the first guest virtual address and data that includes a physical address; and
storing, in the data store, a guest fault flag indicating whether the fault condition corresponding to the first guest physical address occurred during a first stage or a second stage of a two-stage address translation.

9. The method of claim 8, comprising:
transferring the first guest physical address from the data store to a control status register in response to the fault condition being on an entry of the translation lookaside buffer with the tag that includes the guest virtual address matching the first guest virtual address stored in the data store.

10. The method of claim 9, in which the control status register is read by hypervisor software in response to receiving an exception from a processor core including the processor pipeline.

11. The method of claim 8, comprising:
returning a miss to the processor pipeline in response the first address translation request.

12. The method of claim 11, comprising:
in response to the miss, adding the first address translation request to a queue of address translation requests to be retried in program order.

13. The method of claim 8, in which the data store is configured to store a valid flag, comprising:
updating the valid flag to indicate the first guest physical address is ready when storing the first guest physical address in the data store; and
updating the valid flag to indicate the first guest physical address is not ready responsive to transferring the first guest physical address to a control status register.

14. An integrated circuit comprising:
a processor pipeline configured to fetch and execute instructions, including load instructions and store instructions;
a translation lookaside buffer configured to perform two-stage address translation to translate guest virtual addresses to physical addresses, wherein an entry of the translation lookaside buffer includes a tag that includes a guest virtual address and data that includes a physical address;
a data store configured to:
hold a guest physical address and the guest virtual address; and
store a guest fault flag indicating whether a fault condition corresponding to a first guest physical address occurred during a first stage or a second stage of the two-stage address translation; and
a fault handling circuitry that is configured to:
responsive to the fault condition on a hit in the translation lookaside buffer for a first address translation request from the processor pipeline for a first guest virtual address, invoke a single-stage page table walk with the first guest virtual address to obtain the first guest physical address;
cause the translation lookaside buffer to return a miss to the processor pipeline in response the first address translation request; and
store the first guest physical address with the first guest virtual address in the data store.

15. The integrated circuit of claim 14, in which the fault handling circuitry is configured to:
transfer the first guest physical address from the data store to a control status register in response to the fault condition being on an entry of the translation lookaside buffer with the tag that includes the guest virtual address matching the first guest virtual address stored in the data store.

16. The integrated circuit of claim 15, comprising:
an exception handling circuitry configured to update a processor core that includes the processor pipeline in response to exceptions occurring in the processor core, in which the first guest physical address is transferred to the control status register via a signal path through the translation lookaside buffer and the exception handling circuitry.

17. The integrated circuit of claim 15, comprising:
a memory storing hypervisor software that is configured to read the control status register in response to receiving an exception from a processor core including the processor pipeline.

18. The integrated circuit of claim 17, in which the processor pipeline is configured to:
in response to the miss, add the first address translation request to a queue of address translation requests to be retried in program order.

19. The integrated circuit of claim 14, in which the data store is configured to store a valid flag, and in which the fault handling circuitry is configured to:
update the valid flag to indicate the first guest physical address is ready when storing the first guest physical address in the data store; and
update the valid flag to indicate the first guest physical address is not ready responsive to transferring the first guest physical address to a control status register.

* * * * *